US006979101B2

(12) United States Patent
Sauska et al.

(10) Patent No.: US 6,979,101 B2
(45) Date of Patent: Dec. 27, 2005

(54) FLUORESCENT LAMP PROVIDING UNIFORM BACKLIGHT ILLUMINATION FOR DISPLAYS

(75) Inventors: Christian Sauska, Orange, CT (US); Arpad Pirovic, Woodbridge, CT (US)

(73) Assignee: LCD Lighting, Inc., Orange, CT (US)

( * ) Notice: Subject to any disclaimer, the term of this patent is extended or adjusted under 35 U.S.C. 154(b) by 0 days.

(21) Appl. No.: 10/886,220

(22) Filed: Jul. 7, 2004

(65) Prior Publication Data

US 2004/0240202 A1 Dec. 2, 2004

Related U.S. Application Data

(62) Division of application No. 10/228,819, filed on Aug. 27, 2002.

(51) Int. Cl.[7] ............................ F21V 9/16; F21K 2/00; G01F 1/13357

(52) U.S. Cl. ...................... 362/216; 362/260; 362/311; 349/70

(58) Field of Search ................................ 362/216, 260, 362/29, 84, 225, 311; 349/70; 313/491, 492

(56) References Cited

U.S. PATENT DOCUMENTS

| | | | | |
|---|---|---|---|---|
| 2,512,282 A | | 6/1950 | MacGregor | 313/117 |
| 3,121,184 A | * | 2/1964 | Fox | 313/492 |
| 4,288,239 A | | 9/1981 | Hoeh | 65/110 |
| 4,300,073 A | | 11/1981 | Skwirut et al. | 315/53 |
| 4,319,162 A | | 3/1982 | Hoeh | 313/487 |
| 4,337,414 A | | 6/1982 | Young | 315/56 |
| 4,417,172 A | | 11/1983 | Touhou et al. | 313/156 |
| 4,767,193 A | | 8/1988 | Ota et al. | 349/62 |
| 4,772,819 A | | 9/1988 | Ridders | 313/493 |
| 4,871,944 A | | 10/1989 | Skwirut et al. | 315/56 |
| 4,882,520 A | * | 11/1989 | Tsunekawa et al. | 313/643 |
| 4,950,053 A | * | 8/1990 | Haim et al. | 349/70 |
| 5,089,943 A | * | 2/1992 | Wolfelschneider | 362/216 |
| 5,256,935 A | | 10/1993 | Dobashi et al. | 313/491 |

(Continued)

FOREIGN PATENT DOCUMENTS

EP 0 274 269 A1 7/1988

(Continued)

OTHER PUBLICATIONS

Mercer et al, Fluorescent backlights for LCDs, Nov. 1989, Information Display, No. 11, pp 8-13.

*Primary Examiner*—Alan Cariaso
(74) *Attorney, Agent, or Firm*—Fattibene & Fattibene; Paul A. Fattibene; Arthur T. Fattibene

(57) ABSTRACT

A bent fluorescent lamp for backlighting a display providing uniform illumination. A fluorescent lamp is made from a tubular glass envelope having right angles formed therein. The right angles provide improved illumination of a plane surface for backlighting a liquid crystal display. The right angles eliminate dark regions in the illuminated surface. A right-angled bend is also formed at the ends of the fluorescent lamp. An electrode is positioned sufficiently far from a central portion of the lamp so that any dark spaces in the gas discharge of the fluorescent lamp, such as the Faraday dark space associated with a cathode of a lamp are not formed within the central portion. As a result, the central portion of the fluorescent lamp has a uniform brightness or intensity providing improved illumination for backlighting a liquid crystal display. The resulting more uniform illumination with less dark regions results in a more legible display and more accurate information being displayed. A method of forming a right-angled bend in a glass tube is also disclosed.

13 Claims, 5 Drawing Sheets

U.S. PATENT DOCUMENTS 5,441,774 A 8/1995 Dutta et al. ................. 427/476
5,479,328 A * 12/1995 Lee et al. ................... 362/216
5,536,999 A 7/1996 Winsor ....................... 313/493
5,635,794 A 6/1997 Koerfer ...................... 313/493
5,648,827 A * 7/1997 Shaw .......................... 349/70
5,686,795 A * 11/1997 Sakoske et al. ............. 313/492
5,791,770 A 8/1998 Hoyt et al. ................. 362/294
5,818,164 A 10/1998 Winsor ....................... 313/493
5,903,096 A 5/1999 Winsor ....................... 313/493
5,907,222 A * 5/1999 Lengyel et al. ............. 315/158

FOREIGN PATENT DOCUMENTS

EP 0 281 079 A2 9/1988
JP 01 081 159 3/1989
JP 2002 093 230 3/2002
WO WO 95/12964 5/1995

* cited by examiner

FLUORESCENT LAMP PROVIDING UNIFORM BACKLIGHT ILLUMINATION FOR DISPLAYS

RELATED APPLICATION

This application is a divisional of U.S. patent application Ser. No. 10/228,819 filed Aug. 27, 2002 now U.S. Pat. No. 6,791,272, which is herein incorporated by reference.

FIELD OF THE INVENTION

The present invention relates in general to fluorescent lamps used to illuminate a display, and more particularly to a fluorescent lamp providing more uniform illumination to backlight a display.

BACKGROUND OF THE INVENTION

Tubular fluorescent lamps are often used to back light or illuminate a display, such as a liquid crystal display. The fluorescent lamps are usually bent or curved forming a serpentine shape with rounded bends. The bends or curves in the tubular fluorescent lamps have a radius curve. These curves often prevent an adjacent display from being uniformly illuminated. As a result, often portions of the display appear darker than other portions of the display. These dark regions are often in corners of a quadrilateral, rectangular, or square display. These dark regions are undesirable and often lead to the display being less legible or difficult to read.

Additionally, there are dark spaces associated with gas discharge lamps, such as fluorescent lamps. There are several dark spaces adjacent the cathode of a gas discharge lamp. One of these spaces is the Aston dark space. This dark space is a space of unexcited atoms which occurs because the electrons leaving the electrode have less energy than that necessary to produce excitation of the atoms or molecules with which they collide. There are additional dark spaces a predetermined distance from the cathode, such as the Crookes dark space and the Faraday dark space. The Faraday dark space is typically furthest from the electrode. After the Faraday dark space a positive column is formed generating substantially uniform brightness over the remaining length of the tubular gas discharge lamp. The anode also has a dark space associated therewith. Accordingly, the illumination intensity or brightness along the length of a fluorescent tube gas discharge lamp is not uniform. This nonuniformity of illumination or brightens, when used to back light a display, causes difficulty in reading the display and interpreting information contained thereon. This is particularly disadvantageous in critical applications, such as those used in instrumentation, for example in avionics. In avionics, it is critical for features displayed to have a visibility as intended over the entire surface and not to be affected by dark regions of the back light illumination. Improperly backlighting the display or providing a back light that is not uniform in intensity may cause such hazardous results as a misreading of the display. Accordingly, it is essential that in backlighting of displays, especially in avionics or critical applications, that the backlighting illumination intensity be as uniform as possible over the entire planar surface of the display. The displays are often quadrilateral or rectangular, making it difficult to uniformly illuminate the corners of the quadrilateral or rectangular display using existing curved serpentine type gas discharge fluorescent tubes.

SUMMARY OF THE INVENTION

The present invention provides a fluorescent lamp having substantially improved uniform brightness or intensity along the length of the lamp. One embodiment of the present invention has an angled leg having an electrode placed therein. The electrode is spaced a predetermined distance from a central portion of the tubular envelope of the fluorescent lamp so as to be beyond the dark spaces in the gas discharge of the fluorescent lamp.

In another embodiment of the present invention, right angled bends are formed in the fluorescent lamp so as to more uniformly illuminate a square or rectangular display eliminating dark regions over portions of the display.

Another embodiment of the present invention is a method of making right angled bend in a tubular fluorescent lamp.

Accordingly, it is an object of the present invention to provide a fluorescent lamp capable of providing a substantially uniform back light illumination for a display.

It is an advantage of the present invention that dark regions over portions of a display are prevented.

It is a further advantage of the present invention that a display may more easily be read and information thereon displayed more accurately.

It is a feature of the present invention that the electrode in a gas discharge fluorescent lamp is spaced within a right angled bend of a leg of the gas discharge fluorescent lamp a predetermined distance so as to be beyond any dark spaces in the discharge of the lamp.

These and other objects, advantages and features will become readily apparent in view of the following more detailed description.

DETAILED DESCRIPTION OF THE PREFERRED EMBODIMENTS

Figure 1:
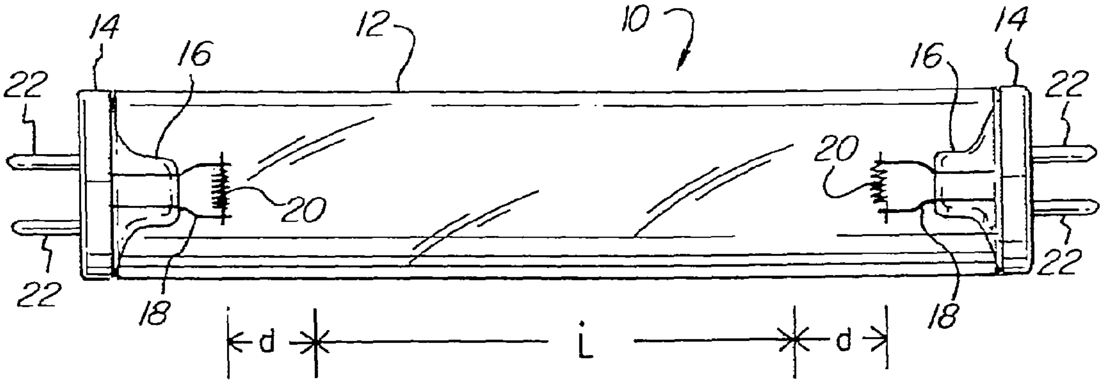
FIG. 1 (PRIOR ART)
FIG. 1 schematically illustrates a prior art tubular fluorescent lamp.

FIG. 1 schematically illustrates a conventional or prior art tubular gas discharge fluorescent lamp. The fluorescent lamp 10 has a tubular glass envelope 12 and end caps 14 on either end. Stems 16 are formed for holding lead wires 18.

Between lead wires 18 are filaments 20. Electrically coupled to the lead wires 18 are contact pins 22. The filaments or electrodes 20 act as either a cathode or anode in the gas discharge fluorescent lamp 10. Between the filaments 20, gas is ionized, causing a discharge. Often, the emitted wavelength of light is in the ultraviolet region, which is not visible. In a fluorescent lamp, a phosphor or fluorescent coating on the glass envelope 12 generates electromagnetic radiation in the visible spectrum when excited by ultraviolet radiation. Accordingly, the fluorescent lamp 10 is caused to radiate electromagnetic radiation in the visible spectrum generating light.

Fluorescent lamps are often used to backlight liquid crystal displays for use in instrumentation or other applications. However, dark spaces are often associated adjacent the electrode 20. The dark spaces generally occur a distance d from the electrodes 20. Therefore, substantial uniform illumination occurs along a longitudinal or axial length i of the fluorescent lamp 10. The non-uniform illumination or brightness along the length of the lamp in most applications is not troublesome. However, when the fluorescent lamp is used to backlight a display, the non-uniform illumination results in uneven illumination of the display causing dark regions.

Figure 1A:
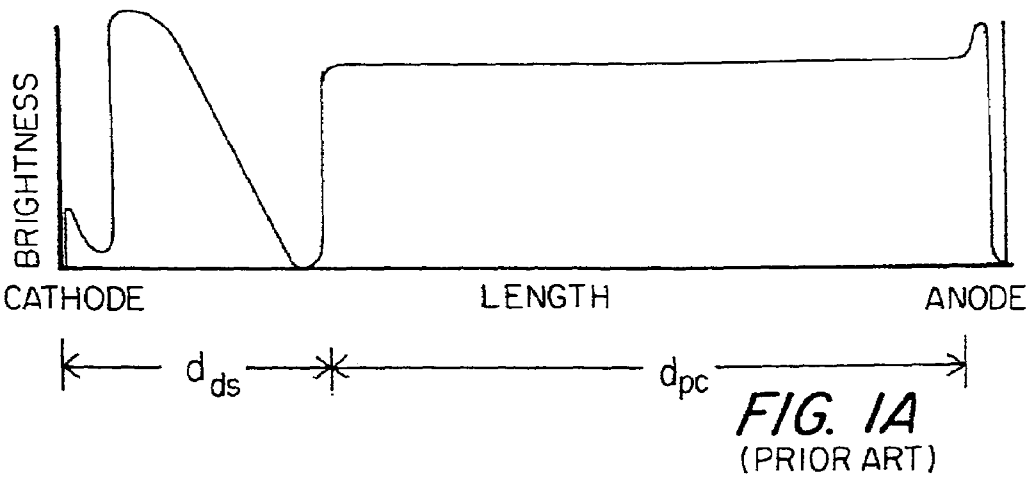
FIG. 1A (PRIOR ART)
FIG. 1A graphically illustrates the variations in brightness or intensity along the longitudinal length of a tubular fluorescent lamp.

FIG. 1A graphically illustrates the brightness or illumination intensity along the longitudinal length of a conventional or typical fluorescent lamp. As can readily be seen, bands of dark spaces or uneven illumination occur along a length $d_{ds}$ adjacent the cathode. Uneven illumination also occurs adjacent the anode. However, at a distance from the anode or cathode, the brightness or intensity is substantially constant or uniform. The uniform illumination occurs along a positive column in the gas discharge for a distance $d_{pc}$.

Figure 2:
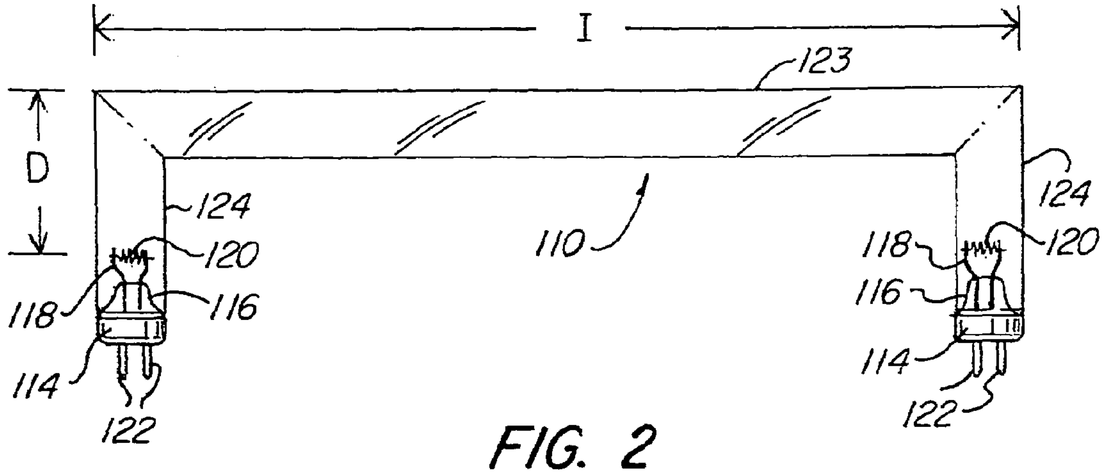
FIG. 2 schematically illustrates the application of the present invention to a tubular fluorescent lamp.

FIG. 2 illustrates an embodiment of the present invention capable of providing substantially uniform illumination or brightness over linear or longitudinal length I of a fluorescent lamp. Fluorescent lamp 110 comprises a linear central portion 123 and right angle bend legs 124 on each end of the linear central portion 123. The legs 124 form substantially a 90° or right angle with the central portion 123. On the ends of the tubular legs 124 are placed end caps 114. A relatively short stem 116 is positioned adjacent the end caps 114 and hold lead wires 118. The stem or mount 116 is relatively short. Placed between the lead wires 118 are filaments or electrodes 120. The electrodes 120 may be any conventional electrode used in a fluorescent lamp, including a coiled filament having an emission material thereon. The electrode 120 is formed a predetermined distance D from the end or furthest surface of the tubular central portion 123. This predetermined distance D is established such that any dark spaces, including the Faraday dark space associated with the cathode, occurs within the predetermined distance D. As a result, a positive column discharge resulting in a substantially uniform brightness or intensity extends the entire axial length I of the tubular central portion 123. The axial length I extends between the legs 124.

This fluorescent lamp structure has the benefit of providing a substantially constant brightness or illumination along the longitudinal length I. This makes possible more uniform illumination of backlit displays, as well as making the display housing more compact.

Figure 3:
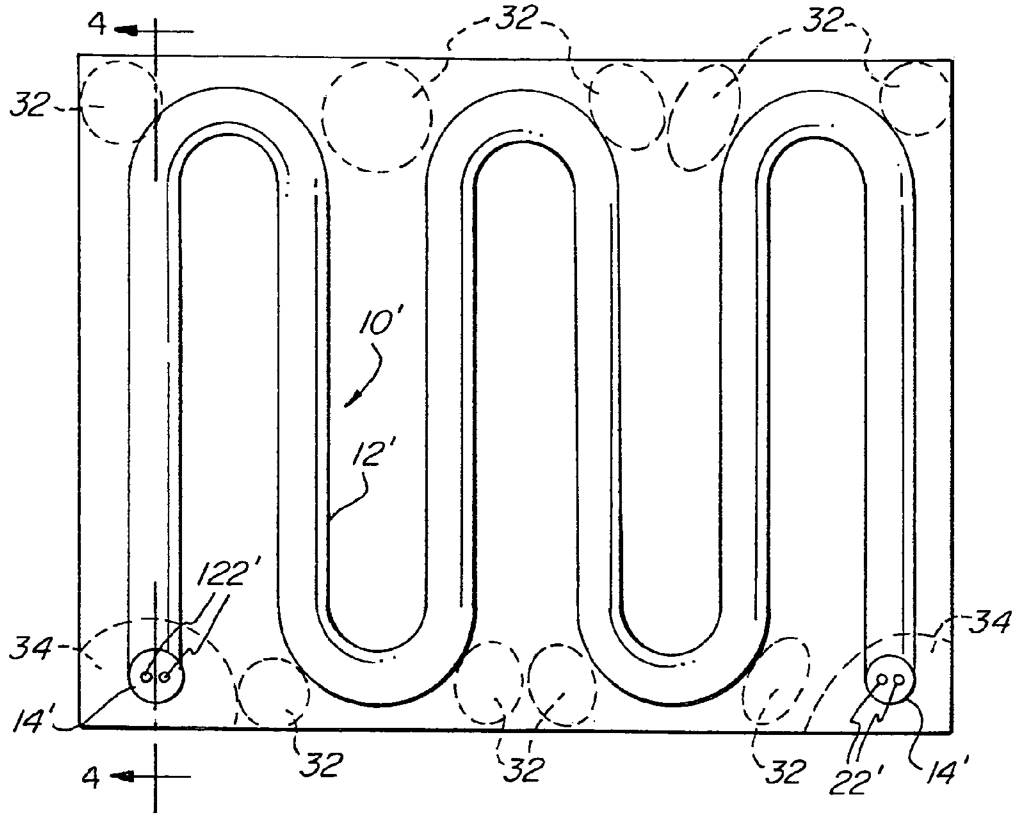
FIG. 3 (PRIOR ART)
FIG. 3 schematically illustrates a rectangular display of the prior art using a serpentine radius curved tubular fluorescent lamp.

FIG. 3 schematically illustrates a conventional technique for backlighting a display. The conventional fluorescent lamp 110 is made from a glass envelope 12' formed in a curved or serpentine shape with curved portions having relatively rounded ends also with a curved radius. As a result of the curved portions, dark regions 32 are formed in the corners as well as adjacent the curved portions. Additionally, dark regions 34 are formed adjacent the end caps 14' of the fluorescent lamp 10' due to the dark space associated with the electrodes of the gas discharge fluorescent lamp 10'. Contact pins 22' are formed on the end caps 14'.

Dark spots or regions are also formed adjacent the ends of the fluorescent lamp 10' due to a non-uniform distance the fluorescent lamp is from a surface.

Figure 4:
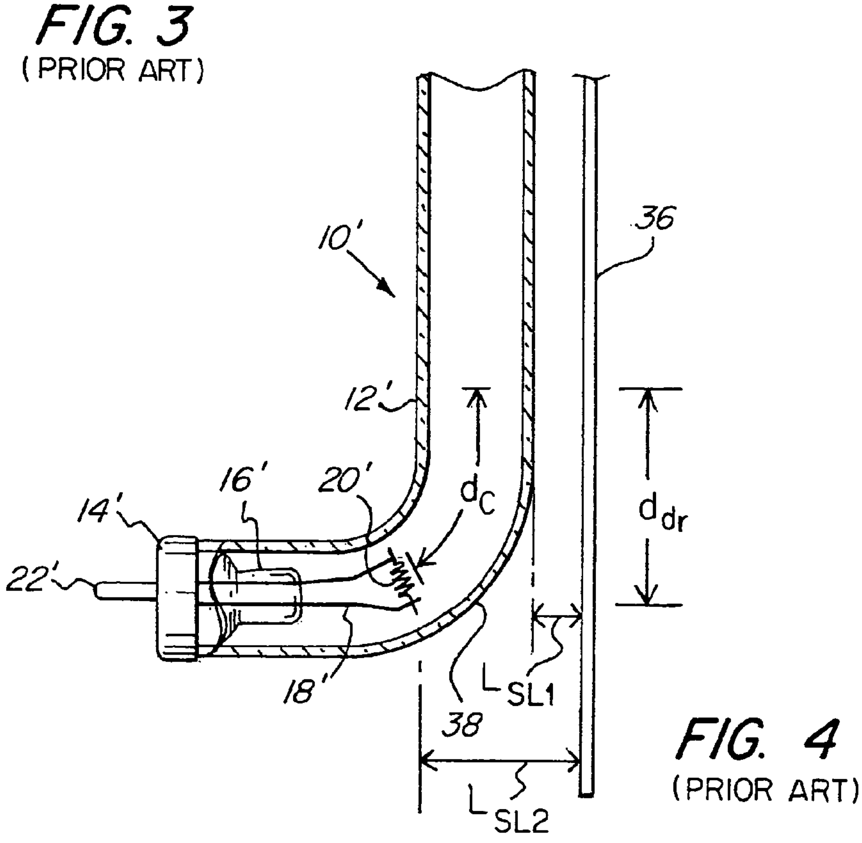
FIG. 4 (PRIOR ART)
FIG. 4 is a cross section taken along line 4—4 in FIG. 3 and schematically illustrates a radius curved tubular fluorescent lamp utilized in the prior art and the location of dark spaces.

FIG. 4 more clearly illustrates this. FIG. 4 is a partial cross-section taken along line 4—4 in FIG. 3 and schematically illustrates a conventional or prior art curved ended fluorescent lamp 10'. The tubular glass envelope 12' has a curve 38 with a radius. The curve 38 causes the distance from a diffuser surface 36 to range from between $L_{SL1}$ and $L_{SL2}$. This varying distance causes non-uniform illumination of the diffuser surface 36, resulting in dark spots or regions. These dark spots or regions result in a display, adjacent the diffuser surface, from being uniformly backlit. Non-uniform illumination is also associated with the various dark spaces, such as the Aston dark space, the Crookes dark space, and the Faraday dark space associated with the cathode of a gas discharge lamp. These dark spaces extend a distance from the electrode or cathode 20' a distance $d_c$. As a result, the dark regions may extend a distance $d_{dr}$ along the diffuser surface 36.

FIG. 4 illustrates the conventional lamp structure having an electrode 20' between the lead wires 18' which are held by a relatively long stem or mount 16'. End cap 14' holds the contact pin 22' electrically coupled to the lead wires 18'. As a result of this conventional or prior art lamp structure, a dark region is formed along a dark region distance $d_{dr}$. This dark region distance $d_{dr}$ is caused by the curve 38 in the tubular glass envelope 12', as well as the dark spaces formed adjacent the cathode or electrode 20' that extend a cathode distance $d_c$.

Figure 5:
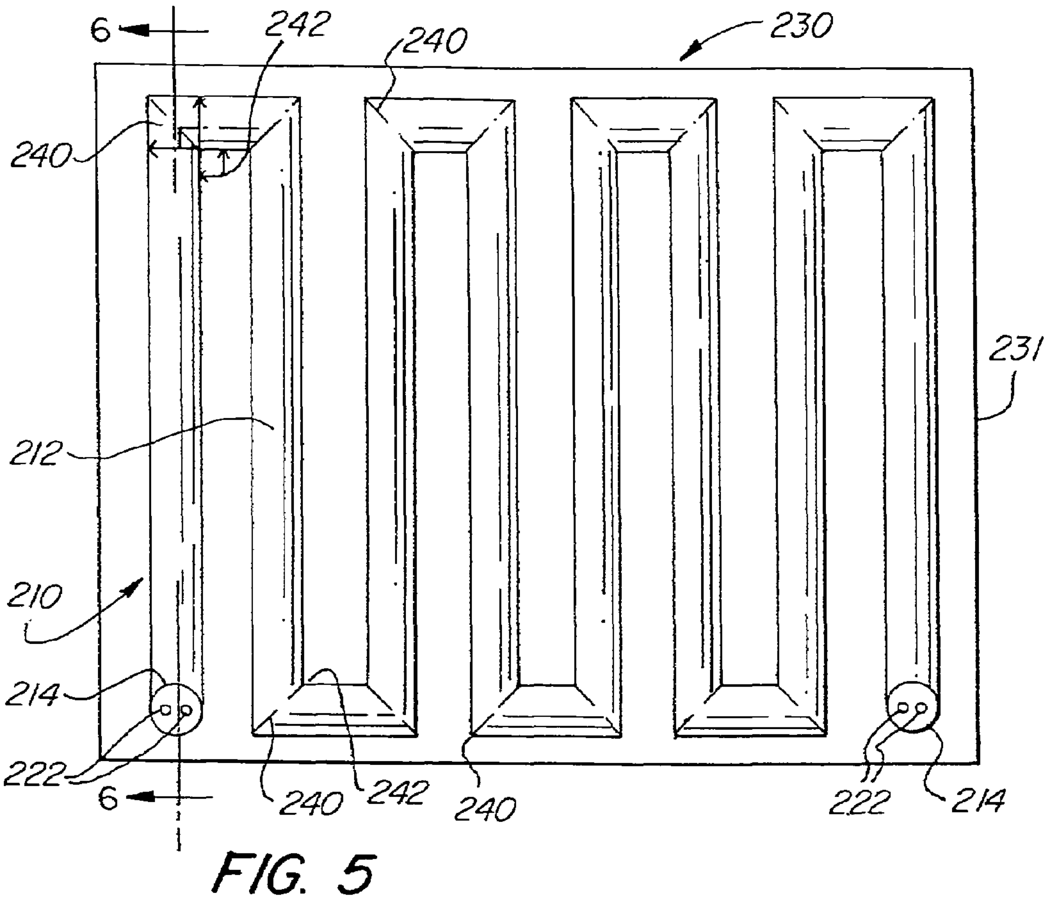
FIG. 5 is an elevational view schematically illustrating the right angled bends utilized in the fluorescent lamp of the present invention.

FIG. 5 schematically illustrates an embodiment of the present invention providing more uniform illumination to a display. The display illuminator 230 comprises a fluorescent lamp 210 having a glass tube or envelope 212 formed with right angles. The outside corners or bends 240 of the glass envelope 212 are formed with right angles. The inside corners or bends 242 are similarly formed with right angles. These right angled bends or corners prevent dark regions from being formed and provide a more uniform illumination. End caps 214 having contact pins 222 are formed in the ends of the glass envelope 212. The ends of the fluorescent lamp 210 are also formed with right-angled corners or bends.

Figure 6:
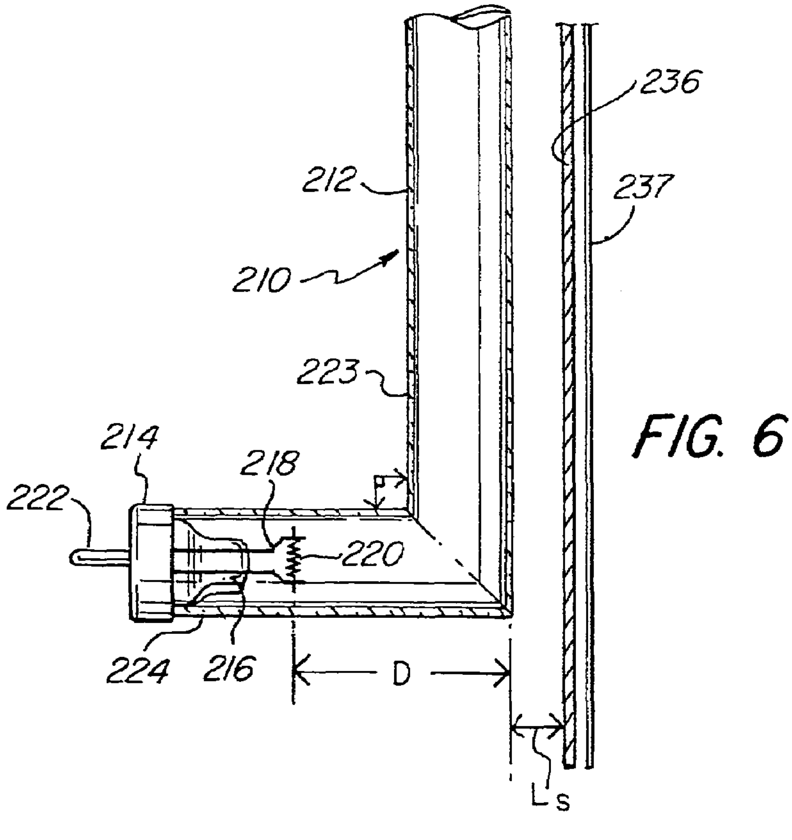
FIG. 6 is a cross section schematically illustrating the positioning of an electrode and the right angled bend in leg of a fluorescent lamp of the present invention.

FIG. 6 is a partial cross-section taken along line 6—6 in FIG. 5 and better illustrates the right-angled bend at the end of the fluorescent lamp 210. The tubular glass envelope 212 has a right-angle bend formed therein. The right-angled bend forms a leg 224 and a central portion 223. Due to this right-angled bend, the distance between a diffuser surface 236 and the central portion 223 is a surface distance $L_S$. This surface distance $L_S$ is a constant over the entire length of the central portion 223. This results in a more uniform illumination being provided to the diffuser surface 236 as a result of the constant distance $L_S$ therefrom. A liquid crystal display 237 is placed adjacent the diffuser surface 236.

Additionally, the leg 224 permits an electrode 220 to be spaced a predetermined distance D from the surface of the central portion 223 of the glass envelope 212. This predetermined distance D is made sufficiently long so that the predetermined distance D is greater than the distance of the Faraday dark spot from the electrode or cathode 220. This results in the Faraday dark spot not effecting the central portion 223, which provides substantially uniform illumination as a result.

To make the leg 224 as short as possible, a small or relatively short mount or stem 216 is used to hold the lead wires 218. On one end of the leg 224 is an end cap 214 through which contact pins 222 are electrically connected to the lead wires 218. The distance between the electrode 220 and the end cap 214 may be approximately 10 millimeters.

The Faraday dark space in a 40-watt fluorescent lamp may be approximately 3 to 5 centimeters from the electrode 220. Accordingly, the predetermined distance D may be approximately 5 centimeters or greater for a 40 watt fluorescent lamp. The positive column discharge over the length of the central portion 223 results in a substantially uniform brightness or intensity. Therefore, less dark spots or regions are formed. Depending upon the type of gas discharge fluorescent lamp, the location of the formation of the Faraday dark spaces may vary. Therefore, the distance D will vary depending upon the design of the fluorescent lamp. However, the location of the Faraday dark space for a particular lamp design is readily determined or may be easily measured by observation. The electrode or cathode 220 need only be positioned within the leg 224 such that the Faraday dark space is formed within the leg 224 and not within the central portion 223.

Figure 7:
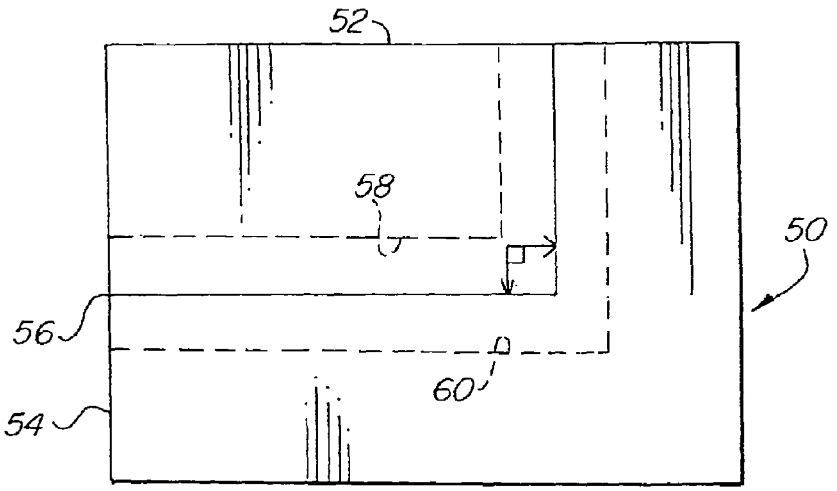
FIG. 7 is an elevational view schematically illustrating a mold utilized in the manufacture of a tubular fluorescent lamp having a right angled bend.

FIG. 7 is a side elevational view schematically illustrating a mold used to make the right angled bends in the glass envelopes or tubes illustrated in FIGS. 2, 5, and 6. The mold 50 has an upper mold portion 52 and a lower mold portion 54. A mold seam 56 divides the upper mold portion 52 and the lower mold portion 54. Formed within the upper mold portion 52 is a upper cavity 58. Formed within the lower mold portion 54 is a lower cavity 60. The upper cavity 58 and the lower cavity 60 mate to form a tube portion with a right angle bend.

Figure 8:
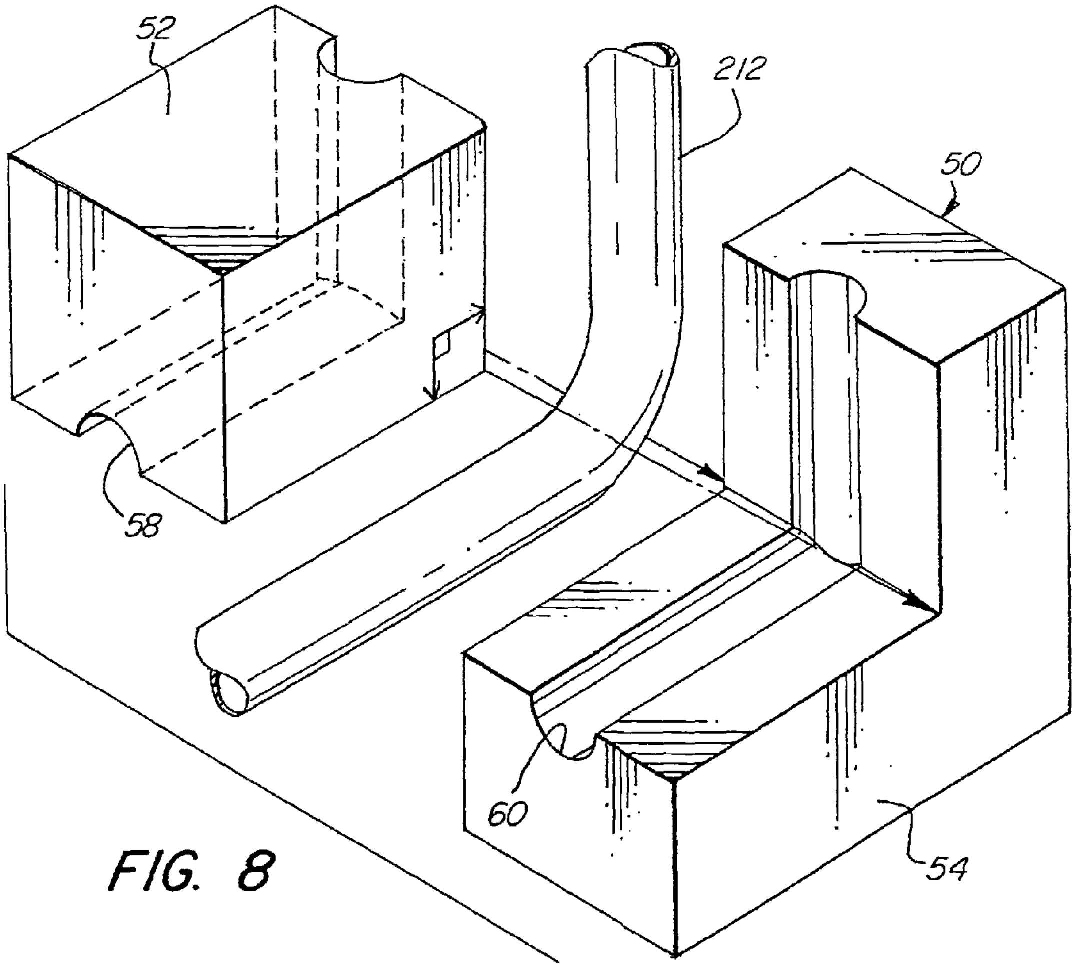
FIG. 8 is a perspective view of a mold for making a right angled bend in a tube used in a fluorescent lamp.

FIG. 8 is a perspective view illustrating the mold utilized in forming the tubular glass envelope 212 used in making the fluorescent lamp of the present invention. The tubular glass envelope 212 is heated such that the glass is in a plastic state or sufficiently soft for placement within the lower cavity 60 of the lower mold 54. When the tube 212 is placed in the lower cavity 60, it takes a generally L shape, conforming to the lower mold portion 54. The upper mold portion 52 is lowered on the lower mold portion 54 such that the upper cavity 58 mates with the lower cavity 60. The soft or plastic glass envelope 212 is forced to conform to the upper and lower cavities 58 and 60. Once the upper mold portion and lower mold portion are secured together, one end of the tube 212 is closed and a gas or air is blown into the other end forcing the plastic or soft glass to take the shape of the upper and lower cavities 58 and 60, forming a right angled bend in the glass tube envelope 212. Multiple bends may be made to form a right-angled bend serpentine fluorescent lamp as illustrated in FIG. 5.

Mounts or stems may then be formed and placed on the glass envelope or tube 212 along with end caps and contact pins so as to form a fluorescent lamp having a right angled bend. The same molding process or steps may be utilized in forming all of the right-angled bends required in making the present invention.

Figure 9:
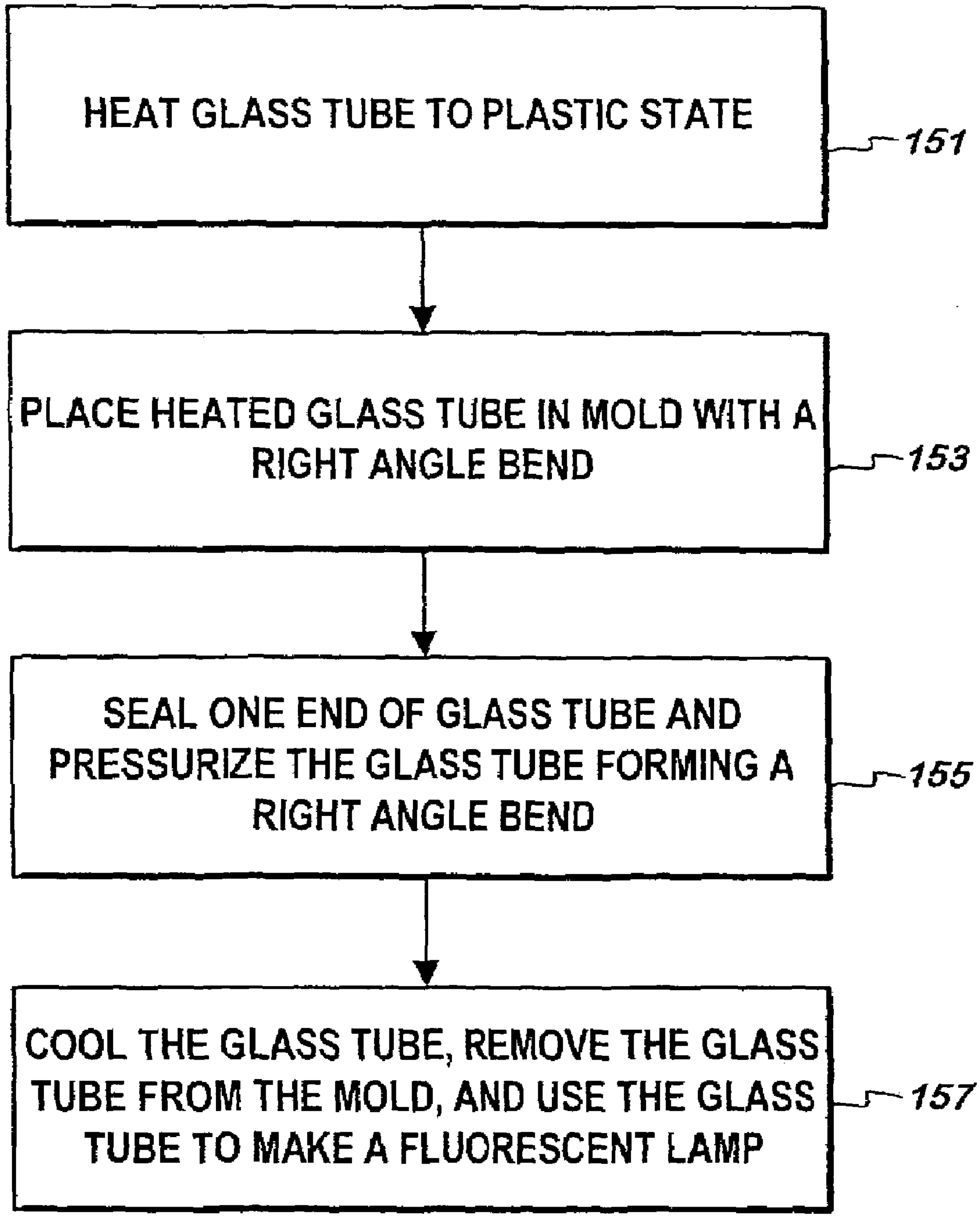
FIG. 9 is a block diagram illustrating the method steps for the manufacture of a tube used with a tubular fluorescent lamp having right angled bends.

FIG. 9 is a block diagram illustrating the method steps of this embodiment of the present invention. Box 151 represents the method step of heating the glass envelope or tube to a soft or plastic state. Box 153 represents the method step of placing the heated glass envelope or tube within a mold having a substantially right-angled or perpendicular bend. Box 155 represents the method step of sealing one end of the glass tube and pressurizing the glass tube with a gas or air so that the tube conforms to the shape of the mold. Box 157 represents the method step of cooling the glass tube, removing it from the mold, and forming a fluorescent lamp having a right angled bend therein.

The present invention provides substantially improved uniform illumination for backlighting a liquid crystal display. The improved illumination is created by using right angled bends to prevent dark spots or regions, as well as positioning the electrode a sufficient distance from the illuminating portion of the fluorescent lamp so that it is unaffected by dark spaces, including the Faraday dark space. This makes possible substantially improved more uniform backlight illumination for a display.

While several embodiments have been illustrated and described, it should readily be appreciated by those skilled in the art that various modifications may be made without departing from the spirit and scope of this invention.

What is claimed is:

1. A fluorescent lamp backlit display comprising:

a frame;

a serpentine fluorescent lamp placed within said frame and having a plurality of right angle bends in a central portion a substantially perpendicular leg having a right-angle bend formed at each end of the central portion;

an electrode held in each said substantially perpendicular leg, wherein each of the electrodes are spaced a predetermined distance from the central portion within the substantially perpendicular leg, the predetermined distance being only as long as needed to be greater than the distance at which a dark space occurs;

a diffuser placed adjacent said serpentine fluorescent lamp comprising the central portion and the right-angled bend of said substantially perpendicular leg; and a display placed adjacent said diffuser, whereby poorly illuminated dark regions on said display are prevented and said display is substantially uniformly backlit improving visibility of the display.

2. A fluorescent lamp backlit display as in claim 1 wherein:

said display comprises a liquid crystal display.

3. A fluorescent lamp backlit display as in claim 1 wherein:

the dark space is a Faraday dark space.

4. A fluorescent lamp backlit display as in claim 1 wherein:

the predetermined distance is greater than five centimeters.

5. A fluorescent lamp backlit display comprising:

a quadrilateral frame;

a serpentine fluorescent lamp placed within said quadrilateral frame and having a plurality of right angle bends in a central portion a substantially perpendicular leg having a right-angle bend formed at each end of the central portion;

a stem placed in each said substantially perpendicular leg;

an electrode held by said stem in each said substantially perpendicular leg, wherein each of the electrodes are spaced a predetermined distance from the central portion within the substantially perpendicular leg, the predetermined distance being only as long as needed and said stem is sufficiently short for the predetermined distance to be greater than the distance at which a dark space occurs;

a diffuser placed adjacent said serpentine fluorescent lamp comprising the central portion and the right-angled bend of said substantially perpendicular leg; and a liquid crystal display placed adjacent said diffuser, whereby poorly illuminated dark regions on said liquid crystal display are prevented and said liquid crystal display is substantially uniformly backlit improving visibility of the liquid crystal display.

6. A fluorescent lamp backlit display as in claim 5 wherein:

the dark space is a Faraday dark space.

7. A fluorescent lamp backlit display as in claim 5 wherein:

the predetermined distance is greater than five centimeters.

8. A fluorescent lamp backlit display comprising:

a frame;

a fluorescent lamp comprising a glass tube having a central portion with a first longitudinal axis and a sharp right angled bend forming legs having a second longitudinal axis, the first longitudinal axis being perpendicular to the second longitudinal axis on each end of said glass tube;

a stem placed in each end of said glass tube;

an electrode placed on each said stem and held a constant predetermined distance from a surface of the central portion of said glass tube, wherein the constant predetermined distance is greater than a distance in which a dark space is formed upon operation of the fluorescent lamp and the leg is only as long as it requires and said stem is sufficiently short so as to result in the dark space occurring within said leg during operation of said fluorescent lamp;

an end cap placed on each end of said glass tube; and contact pins extending through a respective one of said end caps on each end of said glass tube and coupled to a respective one of said electrodes;

a diffuser placed adjacent said fluorescent lamp; and a liquid crystal display placed adjacent said diffuser, whereby a substantially uniform illumination is formed along the central portion of said glass tube.

9. A fluorescent lamp backlit display as in claim 8 wherein:

the glass tube is serpentine in shape having a plurality of bends.

10. A fluorescent lamp backlit display as in claim 9 wherein;

the bends are sharp right angled bends.

11. A fluorescent lamp backlit display as in claim 8 wherein:

the constant predetermined distance is greater than five centimeters.

12. A fluorescent lamp backlit display as in claim 8 wherein:

said stem and said electrode have a combined length less than ten millimeters.

13. A fluorescent lamp backlit display as in claim 8 wherein:

a distance between said electrode and said end cap is less than ten millimeters and the constant predetermined distance is greater than three centimeters.

* * * * *